(12) United States Patent
Ma et al.

(10) Patent No.: US 11,366,049 B2
(45) Date of Patent: Jun. 21, 2022

(54) ESTIMATION OF OBJECTIVE DRIVEN POROUS MATERIAL MECHANICAL PROPERTIES

(71) Applicants: Shouxiang Ma, Dhahran (SA); Syed Shujath Ali, Al-Khobar (SA); Guodong Jin, Katy, TX (US); Hasan Kesserwan, Al-Khobar (SA)

(72) Inventors: Shouxiang Ma, Dhahran (SA); Syed Shujath Ali, Al-Khobar (SA); Guodong Jin, Katy, TX (US); Hasan Kesserwan, Al-Khobar (SA)

(73) Assignees: BAKER HUGHES OILFIELD OPERATIONS LLC, Houston, TX (US); SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/936,829

(22) Filed: Jul. 23, 2020

(65) Prior Publication Data
US 2022/0026336 A1    Jan. 27, 2022

(51) Int. Cl.
*G01N 15/08*    (2006.01)
(52) U.S. Cl.
CPC .................. *G01N 15/088* (2013.01)
(58) Field of Classification Search
CPC .................................. G01N 15/088
USPC ............................................ 702/12
See application file for complete search history.

(56) References Cited

U.S. PATENT DOCUMENTS

| | | | |
|---|---|---|---|
| 2018/0003550 A1* | 1/2018 | Dean ................ | G01L 1/242 |
| 2018/0371903 A1* | 12/2018 | Li ..................... | E21B 49/008 |
| 2019/0101660 A1* | 4/2019 | Johnson ............ | G01V 1/307 |
| 2021/0018643 A1* | 1/2021 | Ulrich, II ......... | E21B 47/00 |

* cited by examiner

*Primary Examiner* — Ricky Go
(74) *Attorney, Agent, or Firm* — Cantor Colburn LLP

(57) ABSTRACT

A method of estimating a material mechanical property of a porous material, for an application or objective with a specific application frequency and application strain amplitude, includes estimating an application frequency and an application strain amplitude for use in a targeted application or objective, and constructing a frequency transfer function relating the material mechanical property to measurement frequencies, the measurement frequency range including a measurement frequency different from the application frequency. The method also includes constructing a strain amplitude transfer function relating the material mechanical property at the measurement strain amplitude and the material mechanical property at the application strain amplitude, the measurement strain amplitude different from the application strain amplitude, deriving the material mechanical property from the frequency transfer function using the application frequency, and predicting the material mechanical property from the strain amplitude transformation function using the derived material mechanical property.

20 Claims, 13 Drawing Sheets

US 11,366,049 B2

ESTIMATION OF OBJECTIVE DRIVEN POROUS MATERIAL MECHANICAL PROPERTIES

BACKGROUND

In hydrocarbon exploration and energy industries, evaluation of subterranean hydrocarbon reservoirs is accomplished using various techniques for measuring formation properties. Mechanical properties of a formation material can be derived from surface measurements of cores and/or from downhole log measurements. The knowledge of mechanical properties of subsurface formations is critical in many applications, including surface and downhole operations. For example, estimations or predictions of mechanical properties are important in many petroleum engineering applications, such as drilling, drill bit design, borehole stability analysis, fracturing operation design, subsidence analysis, and sand production prediction.

SUMMARY

An embodiment of a method of estimating a material mechanical property of a porous material, for an application or objective with a specific application frequency and application strain amplitude, includes estimating an application frequency and an application strain amplitude for use in a targeted application or objective, and constructing a frequency transfer function based on measurement data acquired using measurement signals having a measurement frequency range and a measurement strain amplitude, the frequency transfer function relating the material mechanical property to measurement frequencies, the measurement frequency range including a measurement frequency different from the application frequency. The method also includes constructing a strain amplitude transfer function based on the measurement data, the strain amplitude transfer function relating the material mechanical property at the measurement strain amplitude and the material mechanical property at the application strain amplitude, the measurement strain amplitude different from the application strain amplitude, deriving the material mechanical property from the frequency transfer function using the application frequency, and predicting the material mechanical property from the strain amplitude transformation function using the derived material mechanical property.

An embodiment of a system for estimating a material mechanical property of a subterranean material, for an application or objective with a specific application frequency and application strain amplitude, includes a processing device configured to determine an estimated application frequency and an estimated application strain amplitude for use in a targeted application or objective, the processing device configured to receive measurement data acquired using measurement signals having a measurement frequency range and a measurement strain amplitude. The processing device is configured to construct a frequency transfer function based on the measurement data, the frequency transfer function relating the material mechanical property to measurement frequencies, the measurement frequency range including a measurement frequency different from the application frequency. The processing device is also configured to constructing a strain amplitude transfer function based on the measurement data, the strain amplitude transfer function relating the material mechanical property at the measurement strain amplitude and the material mechanical property at the application strain amplitude, the measurement strain amplitude different from the application strain amplitude. The processing device is further configured to derive the material mechanical property from the frequency transfer function using the application frequency, and predict the material mechanical property from the strain amplitude transformation function using the derived material mechanical property.

BRIEF DESCRIPTION OF THE DRAWINGS

The following descriptions should not be considered limiting in any way. With reference to the accompanying drawings, like elements are numbered alike.

Figure 12:
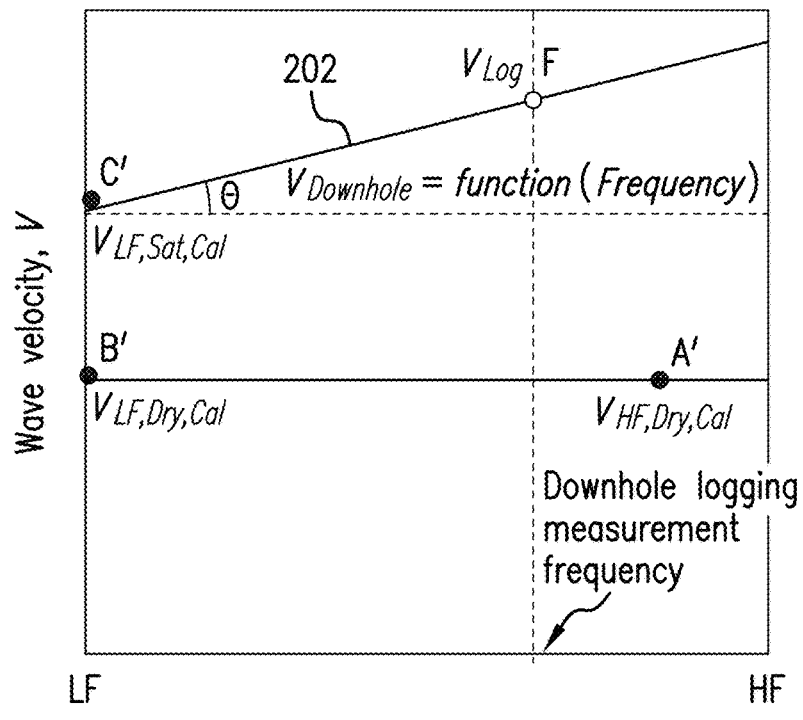
FIG. 12 depicts an example of frequency transfer functions.
Figure 14:
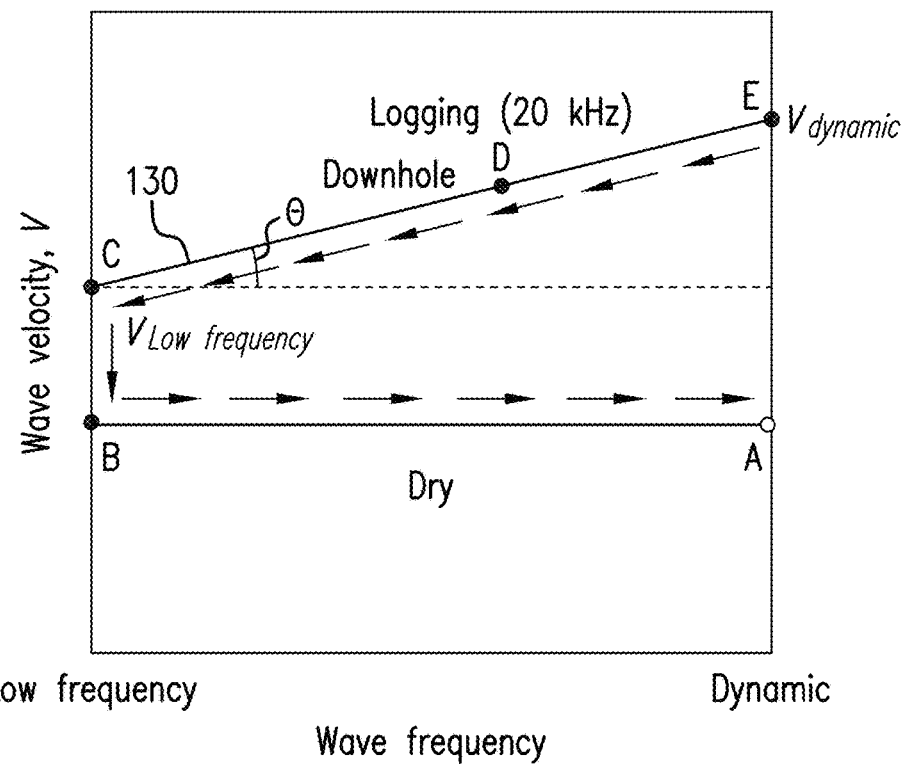
Figure 15:
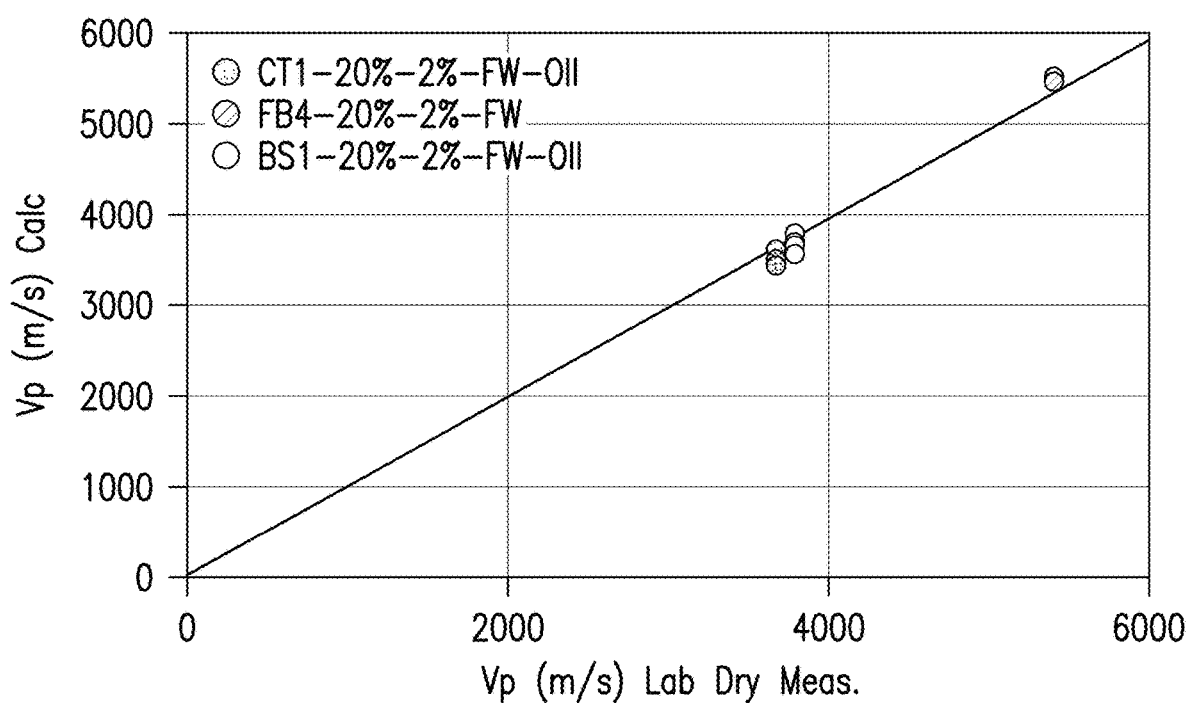

13 illustrates an example of generation of a strain amplitude transfer function and derivation of a mechanical property therefrom;

FIG. 14 illustrates an example of wave velocities calculated according to the method of FIG. 12; and FIG. 15 depicts an example of wave velocities calculated according to embodiments described herein.

DETAILED DESCRIPTION

The systems and methods described herein provide for predicting or estimating material properties of porous media, such as mechanical properties, at a frequency and deformation (strain) amplitude used in an application, from subterranean measurements (e.g., logs) or surface measurements (e.g., laboratory testing). In one embodiment, the material properties include objective-driven or application-driven porous media mechanical properties, such as frequency-dependent formation mechanical properties (e.g., Young's modulus, rock strength) from downhole logs or laboratory testing. Frequency dependent material properties include mechanical properties of a subterranean material that are affected by the parameters of seismic, sonic, ultrasonic signals and/or an operation applied to the material when performing measurements and/or during the application.

An embodiment of a method includes initially determining parameters used in an application that is being performed and/or planned, such as by using a frequency-amplitude space map. Various frequencies and deformation (strain) amplitudes are selected, where at least one of the frequencies is a frequency used in an application (e.g., drilling, hydraulic fracturing, sanding) for predicting the mechanical property (an application frequency Fa), and one of the frequencies is a frequency used to measure a material property under a laboratory and/or subterranean measurement condition (a measurement frequency Fm). Various measurement frequencies Fm and amplitudes (Am) are selected and used to determine material properties at application conditions.

The method also includes constructing a transformation function based on measurements that relates material properties measured under different frequency conditions. The material properties include at least a first property and a second property (e.g., a so-called static property measured at very low frequency and a so-called dynamic property measure at high frequency). An example of a transformation function is a correlation function that relates a static mechanical property and a dynamic mechanical property. The correlation is objective or application driven, in that the type of application or objective (i.e., frequency Fa and strain amplitude (Aa) associated with the application or objective) is considered when building the correlation. It is noted that Fa and Aa for a given application may be the same or different than Fm and Am used in measurements.

Subterranean measurements are performed using a specific frequency (measurement frequency) or other measurement parameter. The transformation function is adjusted using the subterranean measurements. As part of the adjustment, different frequencies or other measurement parameters used during the different measurements (e.g., downhole measurement parameters and laboratory measurement parameters) are considered, as well as the differences between measurement conditions (e.g., dry and saturated). The second material property (e.g., wave velocity or Young's modulus), as a function of application parameters (e.g., frequency and/or amplitude) used during the application is then derived based on the adjusted transformation function.

In one embodiment, adjustment of the transformation function includes calculating a first wave velocity function from surface (e.g., laboratory) measurements performed on a material using the various frequencies and when the material is in various conditions, such as fluid saturation conditions. The various conditions include at least a first condition (a surface or laboratory condition) such as a dry condition, and a second condition (a downhole or subterranean condition) such as a saturated condition or other condition of the material as encountered during the operation. The first wave velocity function describes wave velocity at various frequencies and conditions based on surface (e.g., laboratory) measurements.

Subterranean (e.g., downhole) acoustic measurements are performed and applied to the first wave function to shift or otherwise adjust the first wave velocity function to a second wave velocity function. The adjusted wave velocity function can be used to predict the material property used in an application with a specific frequency and strain amplitude.

The systems and methods described herein provide a number of advantages and technical effects. Embodiments described herein provide an application-driven approach to estimating material properties at an operational frequency and strain amplitude, by generating correlation functions specific to a type of application. As a result, material properties associated with an application at a given frequency and strain amplitude can be accurately predicted.

Conventional techniques for estimating mechanical properties that are used in various engineering applications typically follow two steps. A first step (e.g., Step a of FIG. 2 discussed below) is the determination of rock mechanical properties from surface laboratory triaxial (static) and laboratory ultrasonic (dynamic) measurements, and a second step (e.g., Step b of FIG. 2 discussed below) is to construct a laboratory dynamic and laboratory static rock mechanical property transformation and apply it directly to downhole logging (dynamic) measurements to derive the static mechanical properties to be used during various applications. However, the frequency and deformation amplitude of subterranean materials under an application are often different than that used in the laboratory measurements and/or downhole logging measurements.

Such conventional techniques assume that mechanical properties of materials are universal for all applications, i.e., the effect of the application frequency and strain magnitude in an operation on mechanical properties due to actual conditions is not considered. However, rock mechanical properties can behave differently or may have different values, depending on different applications, where the frequency and strain amplitude applied to the formation are different. Embodiments described herein address such challenges by accounting for the effects of the application frequency and strain amplitude during an operation when predicting material mechanical properties that are used in an application.

Figure 1:
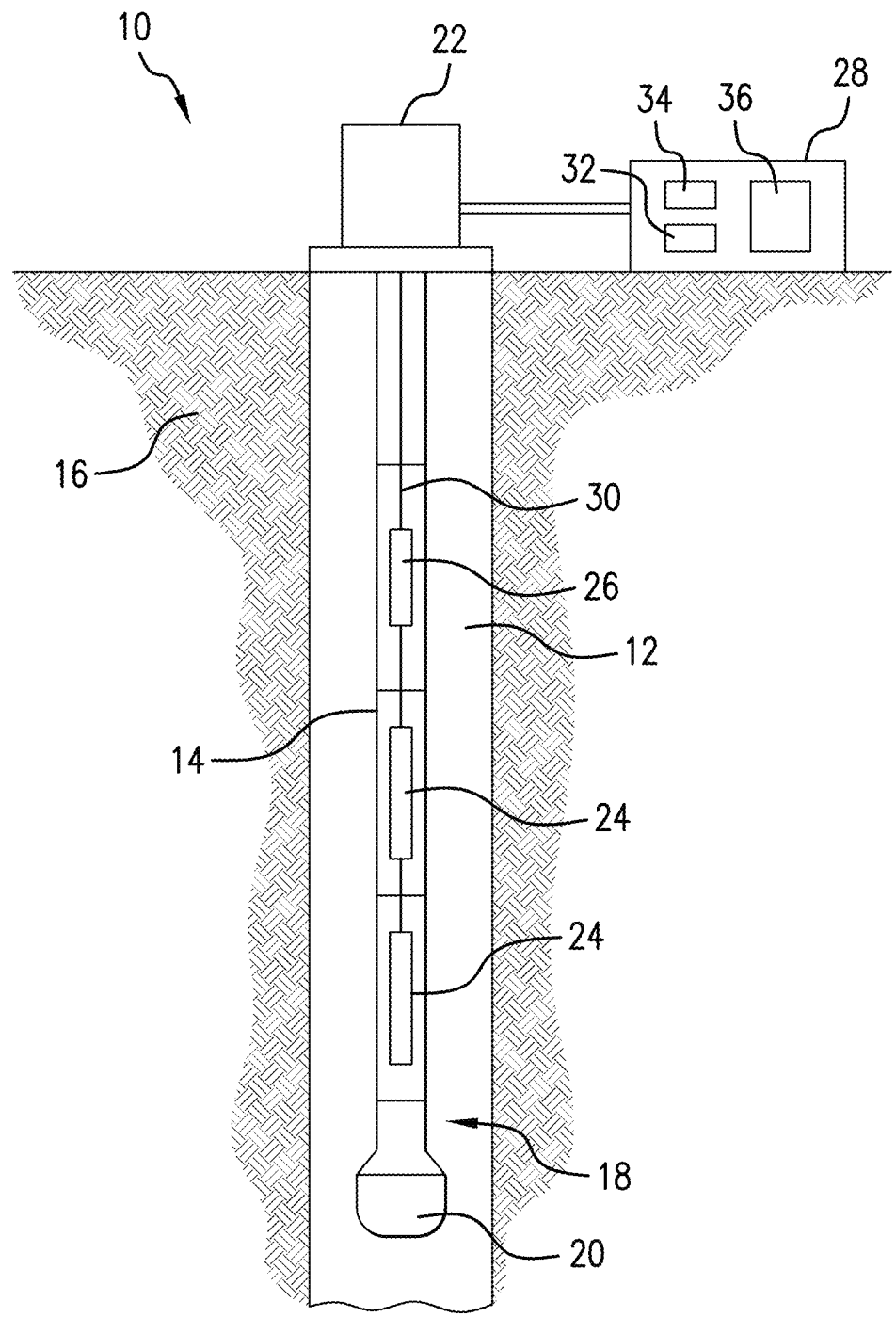
FIG. 1 is a side cross-sectional view of an embodiment of a drilling and/or measurement system.

Referring to FIG. 1, an exemplary embodiment of a system for performing a subterranean application is shown. In this embodiment, the system 10 is a downhole drilling and/or measurement system 10, components of which are disposed in a borehole 12. It is noted that the embodiment is described as a drilling system for illustrative purposes, and is not intended to be limiting. Embodiments described herein may be applicable to any of a variety of applications, including applications performed at or near the surface and/or downhole processes. Examples of surface applications include quarrying, rock sculpting and blasting, demolishing a construction and others. Examples of downhole or subterranean applications include drilling, stimulation (e.g., fracturing), fluid injection, production and others.

A drill string 14 is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. Various measurement tools may be incorporated into the system 10 to affect measurement regimes such as wireline measurement or logging-while-drilling (LWD).

The drilling assembly 18, which may be configured as a bottomhole assembly (BHA), includes a drill bit 20 and is configured to be conveyed into the borehole 12 from a drilling rig 22. In one embodiment, the drilling assembly includes a coring assembly configured to obtain core samples of the formation 16.

In one embodiment, one or more downhole components, such as the drill string 14 and the drilling assembly 18, include sensor devices 24 configured to measure various parameters of the formation and/or borehole. For example, one or more parameter sensors (or sensor assemblies such as LWD subs) are configured for formation evaluation measurements relating to the formation, borehole, geophysical characteristics and/or borehole fluids. These sensors may include formation evaluation sensors (e.g., gamma ray, borehole caliper, resistivity, dielectric constant, neutron porosity, sonic, and density), sensors for measuring geophysical parameters (e.g., sonic velocity or travel time), and sensors for measuring borehole fluid parameters (e.g., resistivity, viscosity, density, clarity, rheology, and pH level).

In one embodiment, one or more of the sensors are configured to perform formation material measurements based on sonic and/or seismic measurements. For example, a sonic measurement device or tool 24 is deployed downhole and used to emit acoustic signals having a selected frequency, detect reflected waves as measurement signals, and estimate material properties such as strength, density, porosity, Young's modulus, bulk modulus and others. Properties of the measurement signals such as sonic velocity are related to mechanical properties of formation material (e.g., rock) such as elastic moduli (e.g., Young's modulus) at the measurement frequency and strain amplitude.

In one embodiment, the drilling assembly 18 and sensor devices 24 are configured to communicate with one or more processors, such as a downhole electronics unit 26 and/or a surface processing unit 28. The processor(s) may receive data and communication signals from the downhole components and/or transmit control signals to the components. Signals and data may be transmitted via any suitable transmission device or system, such as a cable 30. Other techniques used to transmit signals and data include wired pipe, electric and/or fiber optic connections, mud pulse, electromagnetic and acoustic telemetry.

The processor or processors, in one embodiment, are configured to receive data and predict material property as described herein. The surface processing unit 28, the sensor devices 24 and/or other components may also include components as necessary to provide for storing and/or processing data collected from various sensors therein. For example, the surface processing unit 28 includes a processor 32, a data storage device (or a computer-readable medium) 34 for storing, data, models and/or computer programs or software 36.

Generally, some of the teachings herein are reduced to an algorithm that is stored on machine-readable media. The algorithm is implemented by a computer or processor such as the surface processing unit 28 (and/or remote processor(s)) and provides operators with desired output. Aspects of one or more algorithms are presented in the form of workflows or flow diagrams for performing various analyses and processes.

In one embodiment, the surface processing unit 28 or other processing device (also referred to as a "processor") is configured to predict a material property based on building a transformation function, such as a correlation function, that relates a first material property to a second material property, matching the measurement to application frequency. The material may be rock, subterranean materials, etc. In one embodiment, the first material property is a dynamic mechanical property such as dynamic Young's modulus, and the second material property is a static mechanical property such as static Young's Modulus. Other mechanical properties that can be predicted include confined compressive strength, tensile strength and others.

Embodiments described herein provide a methodology of obtaining application objective-driven material (e.g., mechanical) properties. An objective driven material property is a property of a material that can behave differently or have different values depending on a targeted specific application. Embodiments are described herein in the context of porous media mechanical properties, including frequency-dependent formation mechanical properties (e.g., Young's modulus, rock strength). The embodiments are not so limited, as they can be applied to any of various mechanical properties that can be measured on surface or estimated using downhole measurements.

The embodiments provide methods for predicting a material property or properties, which include generating or acquiring a transformation function between material properties based on test measurements, which may include surface measurements and/or downhole measurements. In one embodiment, the transformation function is a correlation function that relates two different mechanical properties, such as static and dynamic Young's modulus. As described herein, "test measurements" refer to measurement data acquired prior to application. The test measurements are used to build the transformation function.

As discussed further below, the transformation function represents a correlation or relationship between at least two material properties (a first property and a second property), such as a dynamic mechanical property and a static mechanical property. The transformation function is used to predict the second material property. In order to accurately predict the second property under application conditions (e.g., application parameters such as frequency and strain amplitude), the method includes developing a wave velocity function based on test measurements, transforming the wave velocity function based on application conditions, and estimating the second property from the transformed or adjusted wave velocity function. The estimated first property is then applied to the transformation function to derive the second material property for a targeted specific application with a specific application frequency and strain amplitude.

Figure 2:
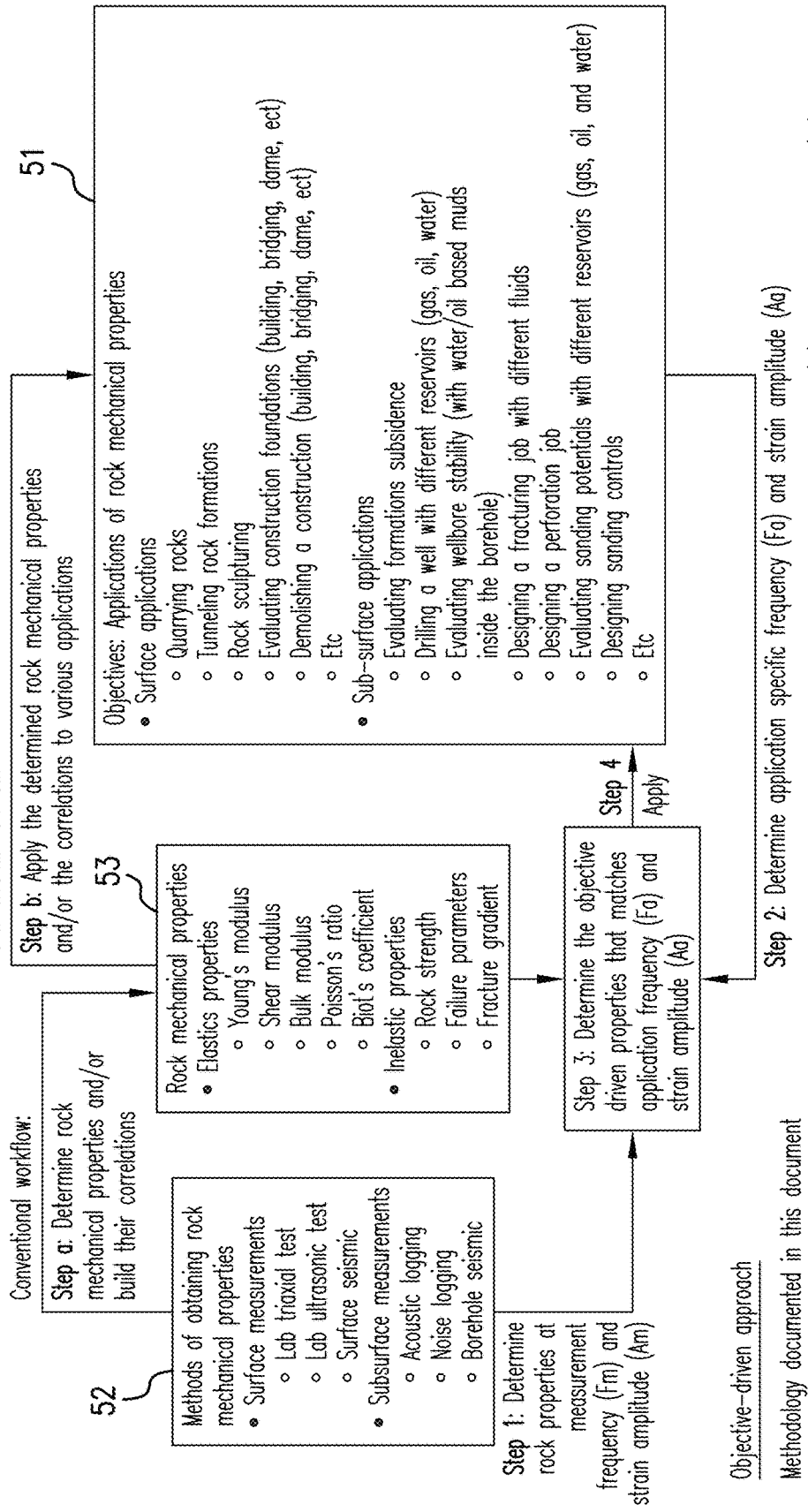
FIG. 2 depicts aspects of an embodiment of a method of estimating subterranean material properties.

FIG. 2 is a block diagram representing general aspects of a method of estimating a material property. The method is discussed in conjunction with blocks 51-53, which represent various measurements, data and information considered when making a material property prediction.

As represented by block 51, the method is based on the specific operation or objective for which the prediction is performed based on the operational frequency and strain amplitude. As noted above, an operation is intended to describe any objective or process for which material property predictions are useful. The operations may be surface operations or subterranean operations. Examples of surface operations include quarrying rocks or other material, tunneling rock formations or other subterranean regions, rock sculpturing, evaluating construction foundations (e.g., for buildings, bridges, dams, etc.) and demolition of constructions. Examples of subterranean operations include evaluating a formation (e.g., evaluating formation subsidence, sanding potentials with different reservoirs (gas, oil, and water)), drilling, borehole evaluations (e.g., stability), perforation, stimulation (e.g., fracturing, acid injection, etc.). Other operations that may be applicable include, drilling a well with different reservoirs (gas, oil, water), evaluating wellbore stability (with water/oil based muds inside the borehole), designing a fracturing job with different fluids, designing a perforation job, designing sanding controls, etc.

As represented by blocks 51 and 52, material property information is acquired from surface and subterranean (e.g., downhole) measurements (block 52) in which the test measurement frequencies may be different from the operational frequency for a specific application objective (block 51). As discussed further below, surface and/or subsurface measurements are used to derive a correlation between a first material property at a measurement frequency (Fm) and amplitude (Am) and a second material property at an application frequency (Fa) and amplitude (Aa). For example, surface laboratory data is collected from core samples to determine stress properties and derive a correlation function between material properties.

As represented by block 53, various rock mechanical properties can be derived from tests at test measurement frequencies and amplitudes. In one embodiment, the material properties include mechanical properties that are frequency-dependent. Examples of such properties include elastic properties such as Young's modulus, shear modulus, bulk modulus, Poisson's ratio, Biot's coefficient, and inelastic properties such as material strength, failure parameters and fracture properties (e.g., fracture size, number, gradient, etc.)

For illustration purposes, FIG. 2 shows aspects of a conventional workflow representing a conventional method of predicting material properties. The conventional workflow includes a first step (Step a) of determining rock mechanical properties and/or correlations between measurements and rock mechanical properties. A second step (Step b) includes applying determined rock mechanical properties and/or correlations to various applications (shown in block 51). For example, the conventional workflow may include measuring dynamic mechanical properties in a lab at an ultrasonic frequency, measuring static mechanical properties in a lab at a lower frequency, building a static-dynamic property transform or transforms, and extracting static mechanical properties. In another example, lab measurements of static mechanical properties are directly used in an application without considering the effects of frequency and strain amplitude. In the above example, incorrect static mechanical values may be derived from the transform(s), because they do not account for effects of frequencies on dynamic mechanical properties.

Embodiments and methods described herein address the above deficiencies and are based on that recognition that rock mechanical properties used for targeted applications should depend on the application frequency (Fa) and strain amplitude (Aa), which may or may not be the same as the measurement frequency (Fm) and strain amplitude (Am) used in establishing the frequency and strain amplitude transform relationships. Therefore, the effect of frequency and amplitude is considered when determining rock mechanical properties for specific applications.

Rock mechanical properties used for targeted applications depend on the application frequency (Fa) and strain amplitude (Aa), which may or may not be the same as the measurement frequency (Fm) and strain amplitude (Am) used in establishing the frequency and strain amplitude transform relationships. Therefore, effect of frequency and amplitude is considered when determining rock mechanical properties for specific applications.

An embodiment of an objective driven workflow is described with reference to FIG. 2. The objective driven workflow includes a number of steps, denoted Step 1, Step 2, Step 3, and Step 4. It is noted that all of the steps may be performed in the order described or in a different order. In addition, the objective driven workflow may exclude one or more of the steps and/or include additional steps.

At Step 1, rock mechanical properties are measured using one or more of various different techniques with various measurement frequencies (Fm) and associated strain amplitudes (Am). Such techniques include, for example, lab static measurements, lab dynamic measurements, downhole logging, seismic measurements and others.

Figure 3:
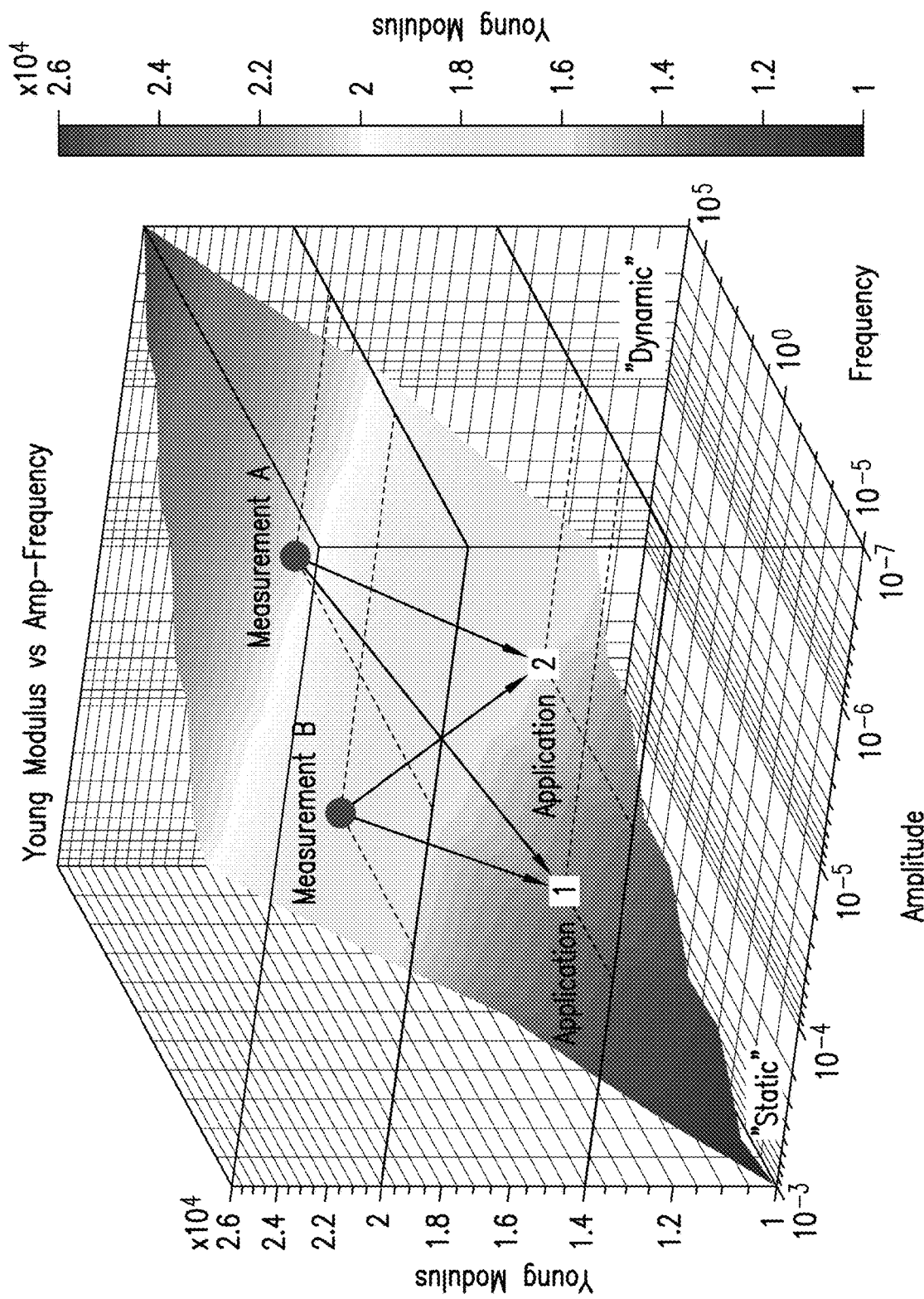
FIG. 3 depicts an example of dependence of a rock mechanical property on frequency and strain amplitude.

A correlation or transform function may be built based on the measurements at Step 1, which relates rock mechanical properties to Fm and Am. An example of a transform function is shown in FIG. 3, which indicates the dependence of a rock mechanical property on frequency and strain amplitude.

At Step 2, the application frequency (Fa) and strain amplitude (Aa) for a target objective or application is determined. Examples of the target application include wellbore stability, hydraulic fracturing design, drill bit design, subsurface subsidence and other applications.

At step 3, rock mechanical properties that correspond to the determined Aa and Fa are derived from the correlation or transform function. For example, the transform function of FIG. 3 provides a value of a rock mechanical property (e.g., point E) that corresponds to the determined Aa and Fa. At step 4, the derived rock properties are applied to the target application or objective.

The method accounts for the observation that the frequency or frequency range (i.e., frequency of acoustic, or other measurement signal, or operations) that is useful for estimating a material property can depend on factors such as the measurement mode (e.g., frequency of acoustic signals), conditions of the material, and the objective for which the material property is being estimated.

Figure 4:
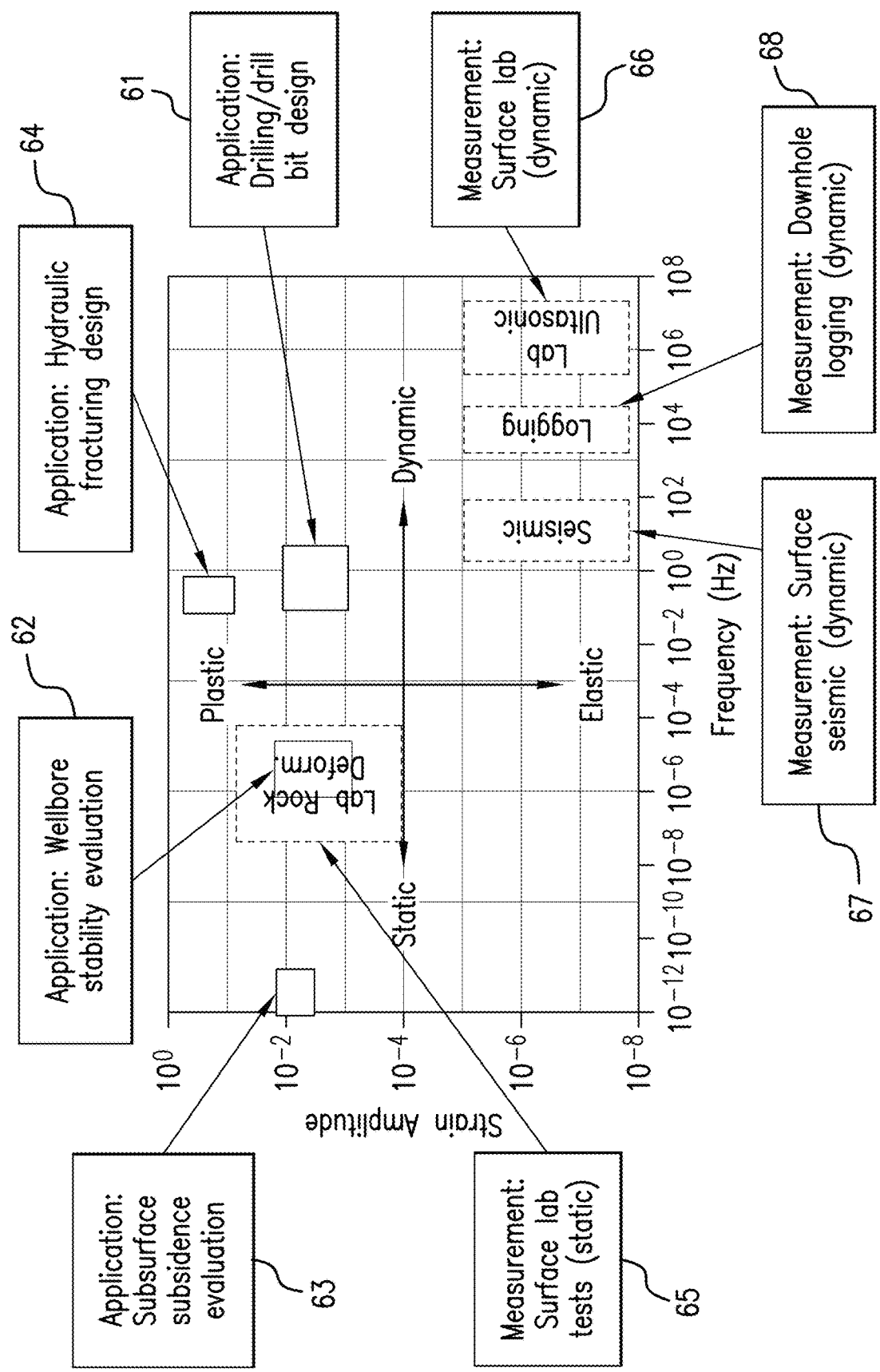
FIG. 4 is a strain amplitude-frequency map that illustrates differences in conditions and measurement parameters used in performing measurements (e.g., rock deformation, seismic, sonic, and ultrasonic measurements) for various applications.

FIG. 4 depicts a frequency-amplitude space map 60 that illustrates how performed measurements of rock mechanical properties (e.g., lab measurements and/or downhole measurements) can have frequencies that are different than the frequencies used in applications.

Measurements can be performed on the surface and/or downhole. The frequency and strain amplitude used in various measurements (e.g., blocks 65, 66, 67 and 68) are called measurement frequency (Fm) and strain amplitude (Am). These measurements are used to build the transformation functions and thereafter used to derive rock mechanical properties used in various applications at selected application frequencies (Fa) and strain amplitudes (Aa). It is noted that static measurements refer to measurements performed at relatively low frequencies (e.g., Fm=$10^{-7}$ to $10^{-4}$), and dynamic measurements refer to measurements performed at higher frequencies, with no consideration with respect to amplitude Applications can be performed on the surface, downhole or both at the surface and downhole. The frequency and strain amplitude used in an application are called application frequency (Fa) and strain amplitude (Aa). Fa and Aa are different in various applications, such as wellbore stability evaluation, hydraulic fracturing design, drill bit design, subsurface subsidence, etc. Fa and Aa may be the same as or different from Fm and Am The frequency-amplitude space 60 shows how measurements performed for different applications encountered in the industry have different frequencies and strain amplitudes. In these examples, measurements performed may have different frequencies depending on the types of measurements (e.g., sonic downhole logging, ultrasonic laboratory testing).

For example, rock mechanical properties for application in drilling evaluation and/or drill bit design employs frequencies Fa of about 0.1-3 Hz (shown graphically as sub-space 61), while the frequencies Fa for borehole stability evaluation are in the range of about $10^{-5}$-$10^{-6}$ Hz (shown as sub-space 62). Young's modulus (YM) is used for both subsidence analysis and hydraulic fracturing design, whose frequencies and strain amplitudes are different. For example, estimations of YM for subsidence analysis or evaluation employs frequencies Fa of about $10^{-12}$-$10^{-11}$ Hz and strain amplitudes of around about 0.01 (shown as sub-space 63). In contrast, estimations of YM for fracturing design employs frequencies Fa of about 0.1-0.5 Hz and strain amplitudes of about 0.1-0.5 (shown as sub-space 64). It is expected that formation strength and Young's modulus will be different when interacting with external forces with different frequencies and strain amplitudes.

Rock mechanical properties (e.g., Young's modulus and strength) are commonly derived from laboratory deformation measurements, in which the frequency Fm range is from $10^{-7}$ to $10^{-4}$ (see sub-space 65), which is different from those used in laboratory ultrasonic test measurement (sub-space 66), seismic measurements (sub-space 67), and downhole logging measurements (sub-space 68). For any specific application or objective, formation mechanical properties should be derived or measured under a specific frequency or frequency range, and under a specific strain amplitude or amplitude range.

Figure 5:
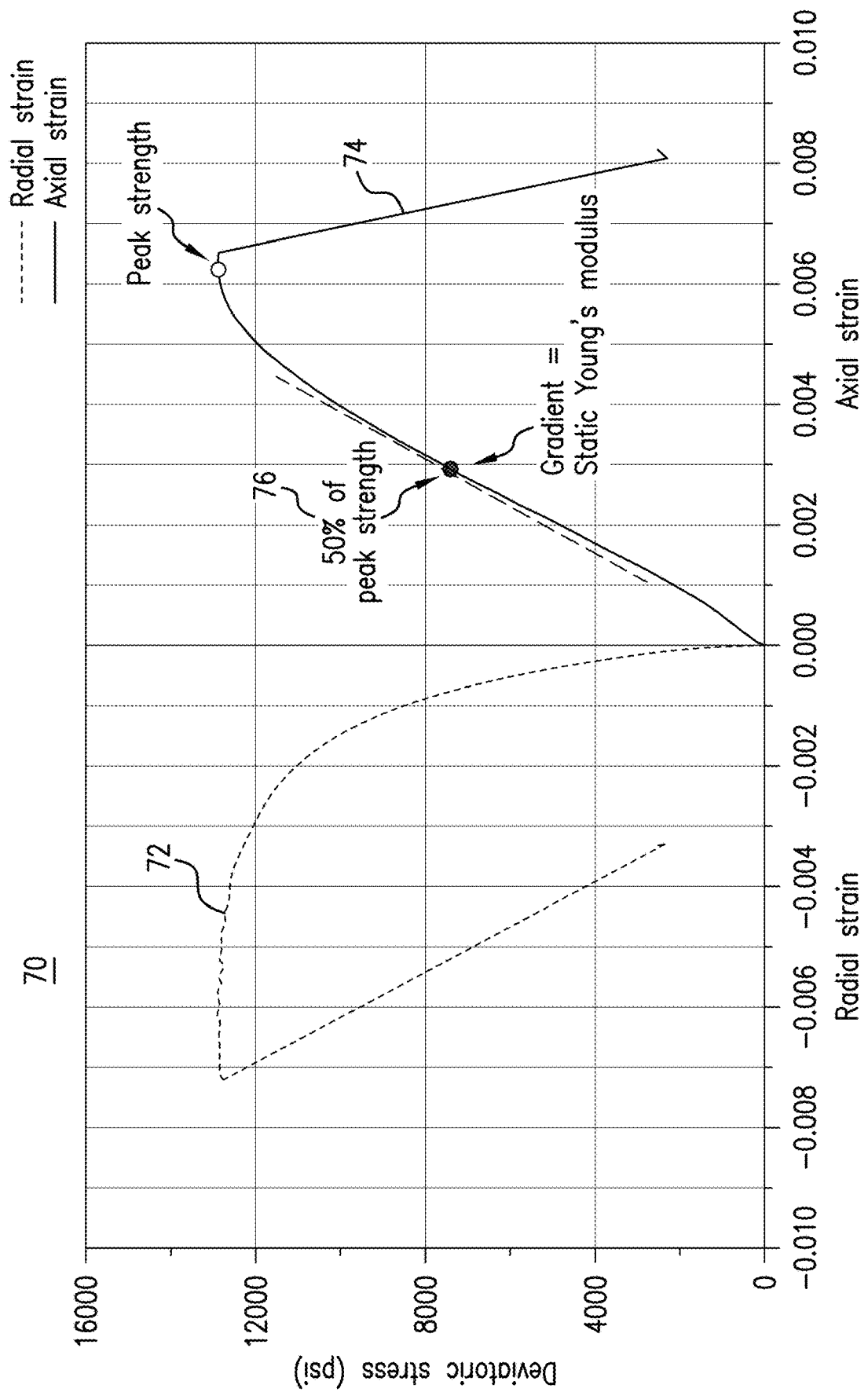
FIG. 5 depicts an example of stress-strain curves used to construct a correlation between material properties.
Figure 6:
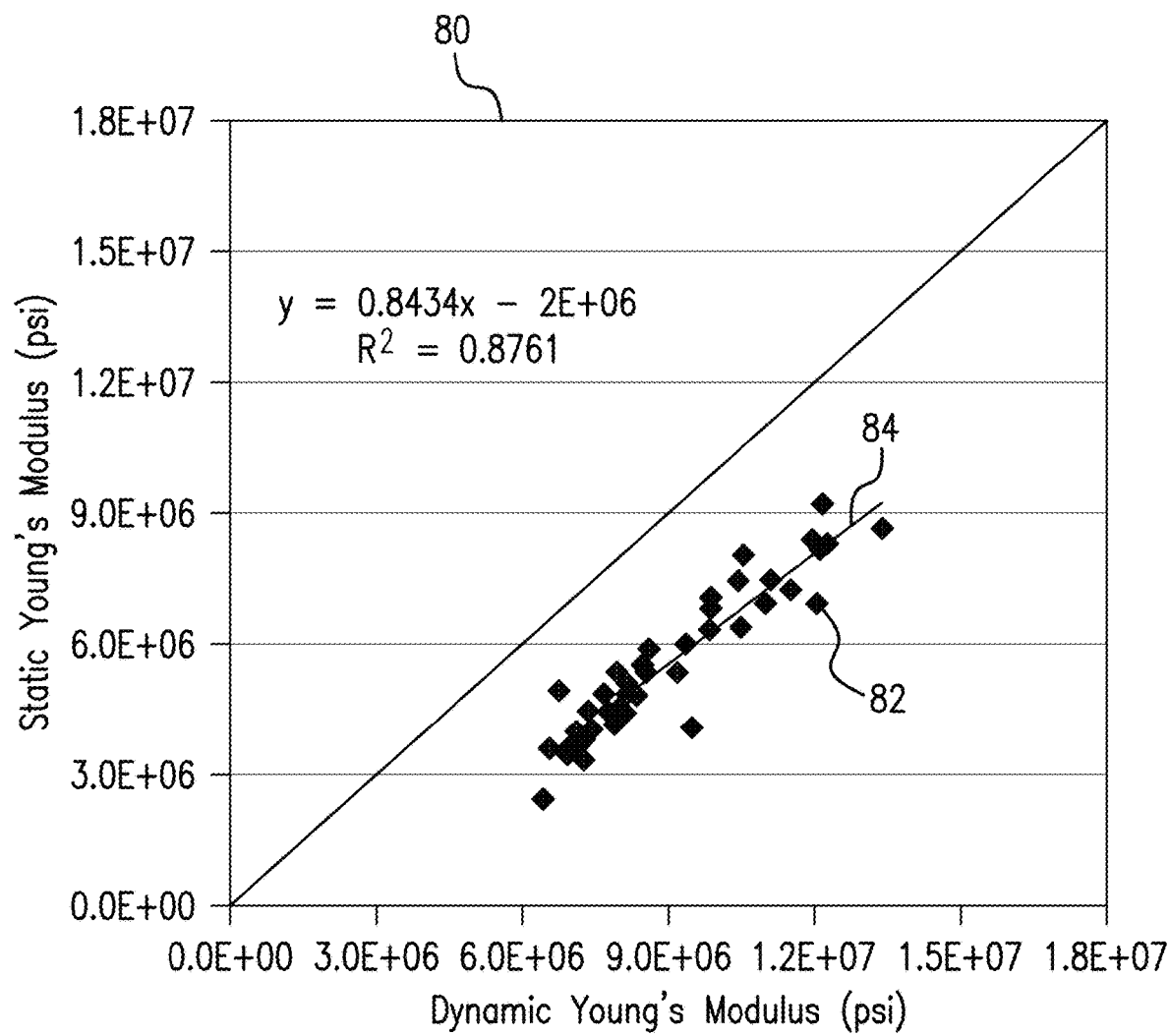
FIG. 6 depicts an example of a correlation function constructed based on the stress-strain curves of FIG. 5.

FIGS. 5 and 6 illustrate an example of current practice in the industry of generating a correlation or transform function. In this example, the correlation function relates the so-called lower frequency static Young's modulus ($E_s$) and the higher frequency dynamic Young's modulus ($E_d$) of a formation material. The correlation is not so limited. For example, the correlation function can be built to relate a variety of material and/or mechanical properties.

Referring to FIG. 5, the static Young's modulus is determined by measured stress-strain data, such as stress-strain data 70 measured on a core sample in a rock mechanics laboratory. The stress-strain data 70 includes a radial strain curve 72 and an axial strain curve 74. The lower frequency so-called static Young's modulus, $E_s$ in this example, is computed at 50% of the peak strength, represented by point 76. The higher frequency so-called dynamic Young's modulus ($E_d$) can be calculated from downhole sonic and density logs or laboratory ultrasonic wave velocity measurements on core samples.

The dynamic Young's modulus can be calculated based on the following equation:

$$E_d = \frac{\rho V_S^2(3V_P^2 - 4V_S^2)}{V_P^2 - V_S^2} \quad (1)$$

Where $E_d$ is the dynamic Young's modulus, $V_p$ and $V_s$ are the compression (P) and shear (S) wave velocities measured from downhole logging tools or laboratory ultrasonic experiments, respectively, and $\rho$ is the bulk density of the formation or rock samples.

FIG. 6 shows an example of a correlation function illustrated as a function of static and dynamic Young's modulus. The correlation function is built based on ultrasonic measurements performed in a laboratory on core samples. In this example, a correlation function is derived by plotting measurement data on a graph 80. The measurement data is shown as data points 82, from which a correlation function 84 is derived, which in this example is a linear function.

It is noted that directly applying this correlation for predicting static Young's modulus profile from downhole logs may not be accurate, because the frequency used in acoustic logging tools is different from those typically used in lab instruments. In addition, laboratory ultrasonic wave velocity measurements are usually conducted on dry rock samples at room temperature, while downhole formation rock is saturated with various types of fluids (water, oil and water, gas and water, and gas, oil, and water) at in-situ condition of high temperature and pressures, resulting the discrepancy of wave velocities between lab and downhole measurements.

Figure 7:
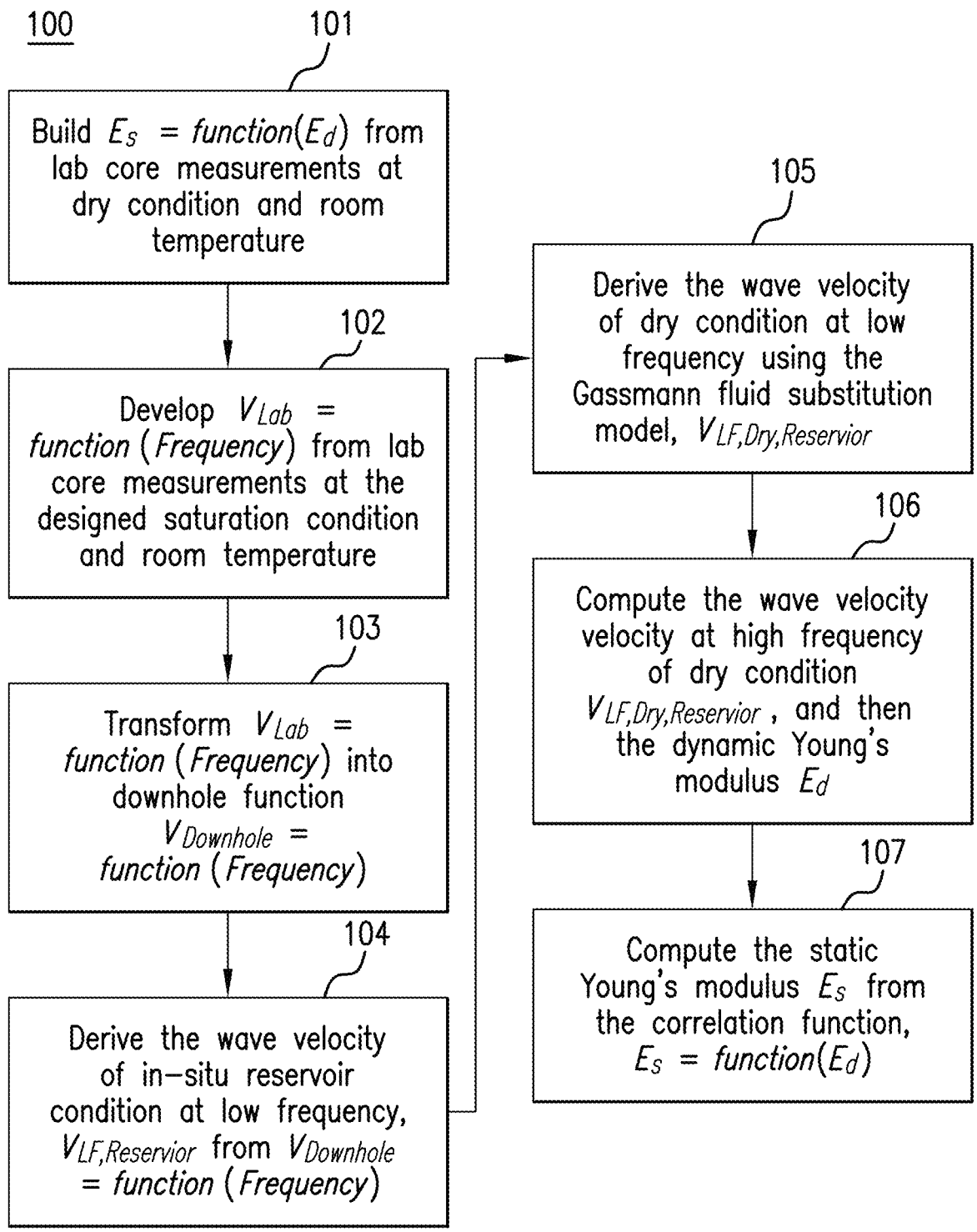
FIG. 7 is a flow chart depicting an embodiment of a method of predicting a subterranean material property.

FIG. 7 illustrates aspects of an embodiment of a computer-implemented method 100 of predicting a material property such as a rock or other material mechanical property. The method 100 may be performed by a processor or processors (e.g., the downhole electronics unit 26 and/or the surface processing unit 28), either exclusively or in conjunction with a human operator. The method 100 is discussed in conjunction with the system of FIG. 1, but can be performed by any suitable processing device or system.

The method 100 includes a plurality of stages or steps represented by blocks 101-107, all of which can be performed sequentially. However, in some embodiments, one or more of the stages can be performed in a different order than that shown or fewer than the stages shown may be performed.

As an example, the method 100 provides for predicting the static Young's moduli profile from downhole logs, but can be applied to any desired mechanical or material property at any desired frequency and strain amplitude, based on target application(s). In addition, the method 100 is discussed in conjunction with a drilling operation, however the method is applicable to any desired application.

At block 101, a correlation function relating a first material property and a second material property of a subterranean material is generated or acquired. The correlation function is based on test measurements performed at the surface (e.g., laboratory core measurements) and/or downhole (during previous phases of the operation and/or during another operation performed at the same or similar location, and/or during an operation performed in a similar formation). For example, the correlation function 84 is generated from test measurement data acquired by lab triaxial tests and ultrasonic measurements of core samples of subterranean material.

In one embodiment, the correlation function relates a static material property to a dynamic material property. A static property refers to a property that is measured at very low frequency once equipment is installed in place, such as rock strength, hardness, etc. A dynamic property may change with frequency due to interactions between downhole components and formation materials, fluid circulation and other factors. The correlation function is described below in the context of predicting static Young's modulus based on a correlation between the dynamic Young's modulus and the static Young's modulus, but is not so limited.

For example, the correlation function 84 between surface derived (i.e., lab-derived) static and dynamic Young's moduli for a material or materials (e.g., rock samples) is first built through performing laboratory tests on core samples under a first condition, e.g., a dry condition at room temperature. The tests are based on, for example, acoustic measurements having at least one test measurement parameter. For example, the test measurement parameter includes a frequency of ultrasonic signals. The result is a correlation between the static Young's modulus ($E_s$) and the dynamic Young's modulus ($E_d$)

At block 102, a wave velocity function $V_{Lab}(f)$ based on test measurements is generated by measuring wave velocity at various frequencies and conditions. The velocity function $V_{Lab}(f)$ describes the wave velocity as a function of frequency (i.e., $V_{Lab}=f(\text{frequency})$) at various material conditions. The material condition includes at least one test condition, such as a dry condition (i.e., no significant fluid in the material pore structure), and at least one subterranean condition, such as a fully or partially saturated condition.

The wave velocity function $V_{Lab}(f)$ also describes the wave velocity at various frequencies. The frequencies include at least one test frequency Fm, such as an ultrasonic or other acoustic frequency typically used in testing environments (e.g., laboratories). The frequencies also include at least one other frequency, i.e., measurement frequency or frequencies Fm used to perform downhole measurements and/or the application frequency Fa due to downhole component movement (e.g., rotational rate and/or vibration) during an application.

For example, the velocity function $V_{Lab}(f)$ is based on wave velocities and at conditions including a dry condition, and conditions in which the core sample is saturated with fresh water (FW), 2% brine, 20% brine and oil, respectively. The wave velocity V under such frequencies and conditions may be measured from core samples, or considered to be known based on pre-existing information.

Figure 8:
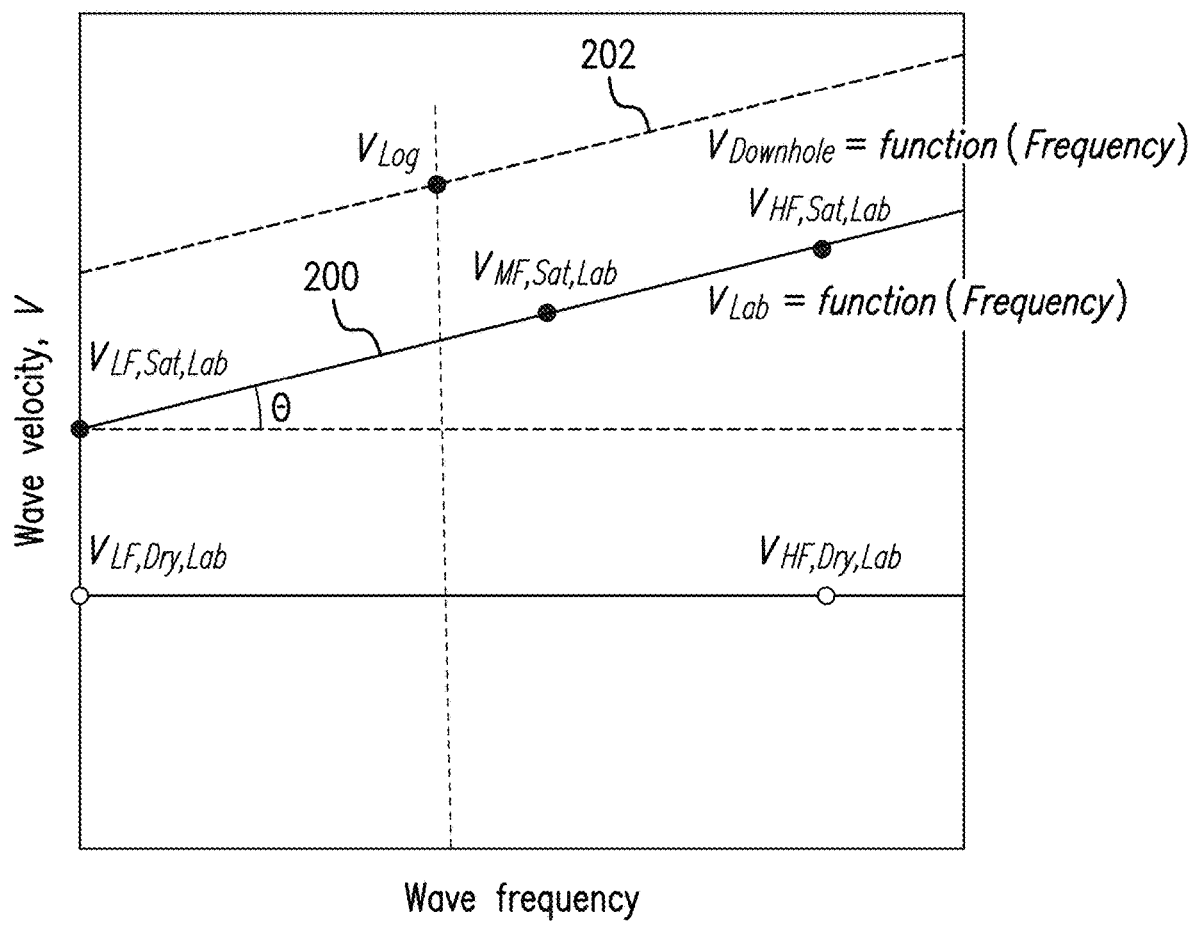
FIG. 8 depicts an example of a wave velocity function derived based on the method of FIG. 7.

An example of the $V_{Lab}(f)$ function is shown in FIG. 8 as line 200. In this example, the $V_{Lab}(f)$ function is constructed based on velocities measured at a low frequency (LF), one or more medium frequencies (MF) and a high frequency (HF). The high frequency HF is an ultrasonic or other acoustic wave frequency typically used in testing environments. It is noted that these frequencies are described in relative terms and are not intended to limit the frequencies that can be used.

The medium frequency MF is at a frequency at which a downhole logging tool operates (e.g., about 20 kHz), the high frequency HF is an ultrasonic frequency (e.g., about 1000 kHz) used in surface tests, and the low frequency LF is a lower surface test frequency.

In one embodiment, the $V_{Lab}(f)$ function is derived from test measurements performed at various frequencies when the core sample is under one or more conditions expected to be encountered downhole, such as saturation conditions. For example, wave velocities $V_{HF,Sat,Lab}$ are measured based on test measurements using a high frequency HF in a laboratory on a sample under a saturated condition (Sat). Wave velocities $V_{MF,Sat,Lab}$ are measured based on test measurements using one or more medium frequencies MF. Wave velocities $V_{LF,Sat,Lab}$ associated with a low frequency LF or other operating frequency can be directly measured or derived from the $V_{Lab}(f)$ function.

At block 103, the surface-derived velocity function $V_{Lab}(f)$ is shifted or otherwise adjusted based on downhole measurements (e.g., logging measurements). For example, downhole wave velocity measurements ($V_{log}$) taken at a frequency are compared to wave velocity measurements according to the $V_{Lab}(f)$ function, and the $V_{Lab}(f)$ function is shifted, e.g., as shown in FIG. 7, to a wave velocity function $V_{Downhole}(f)$. This function is also referred to as a "frequency transfer" function or a "frequency transformation" function At block 104, the wave velocity $V_{LF,Reservoir}$, which represents the wave velocity at a downhole measurement frequency and a subterranean condition (e.g., saturated), is derived from the $V_{Downhole}(f)$ function. For example, as shown in FIG. 7, the wave velocity $V_{LF,Reservoir}$ at the low frequency LF is derived from the $V_{Downhole}(f)$ function, shown as line 202.

At block 105, the wave velocity $V_{LF,Reservoir}$, which is associated with the saturated condition, is transformed into a wave velocity value $V_{LF,Dry,Reservoir}$ under the test condition (e.g., dry). In one embodiment, the wave velocity $V_{LF,Dry,Reservoir}$ is derived using a fluid substitution model, or other model or simulation. An example of such as model is a Gassmann fluid substitution model.

An example of a procedure of deriving wave velocity at a dry condition follows. In the following example, the wave velocity at the dry condition is denoted as $V_{P0}$, which is the compression (P) wave velocity at the dry condition, and $V_{S0}$ is the shear (S) wave velocity at the dry condition. The P and S wave velocities $V_P$ and $V_S$ at a downhole condition (e.g., fully saturated) can be represented as:

$$V_S^2 = \frac{G}{\rho_R}, \text{ and}$$

$$\rho_B V_P^2 = \frac{(K_s - K_{fr})^2}{K_s\left(1 - \phi - \frac{K_{fr}}{K_s} + \phi \frac{K_s}{K_{fl}}\right)} + K_{fr} + \frac{4}{3}G,$$

where $$G = (1-\phi)\rho_s V_{S0}^2, \text{ and}$$

$$K_{fr} = (1-\phi)\rho_s\left(V_{P0}^2 - \frac{4}{3}V_{S0}\right).$$

In the above equations, G and $K_{fr}$ are the shear and bulk modulus of the rock frame at the dry condition, $K_{fl}$ and $\rho_{fl}$ are the bulk modulus and density of fluid in the rock, $\rho_B$ and $\rho_s$ are the rock bulk density and solid material density; $K_e$ is the bulk modulus of the solid material, and $\phi$ is the porosity. Various methods are available for determining the parameters in the Gassmann fluid substitution equations above. The Gassmann equation can be used to derive wave velocities at the fully saturated or dry condition.

At block 106, the wave velocity $V_{LF,Dry,Reservoir}$ (at the low frequency under the dry condition) is used to determine the wave velocity under the dry condition at the high frequency (e.g., test frequency). This wave velocity, denoted as $V_{HF,Dry,Reservoir}$, can be computed based on $V_{LF,Dry,Reservoir}$. For example, the wave velocity at a dry condition can be considered to be independent of frequency, thus $V_{HF,Dry,Reservoir}$ can be considered to be the same as $V_{LF,Dry,Reservoir}$. The dynamic Young's modulus ($E_s$) is then derived from the dry frequencies.

At block 107, the static Young's modulus ($E_d$) is derived from the correlation function (e.g., the function 84) using the derived dynamic Young's modulus $E_s$.

If rock mechanical properties at the targeted application frequency (Fa) and strain amplitude (Aa) are not available or cannot be measured from rock samples (e.g., no rock samples or no techniques to measure), they can be derived from other available measurements such as lab, seismic, and/or downhole logging. In this case, transfer functions are established by considering effects of frequency and strain amplitude.

Figure 9:
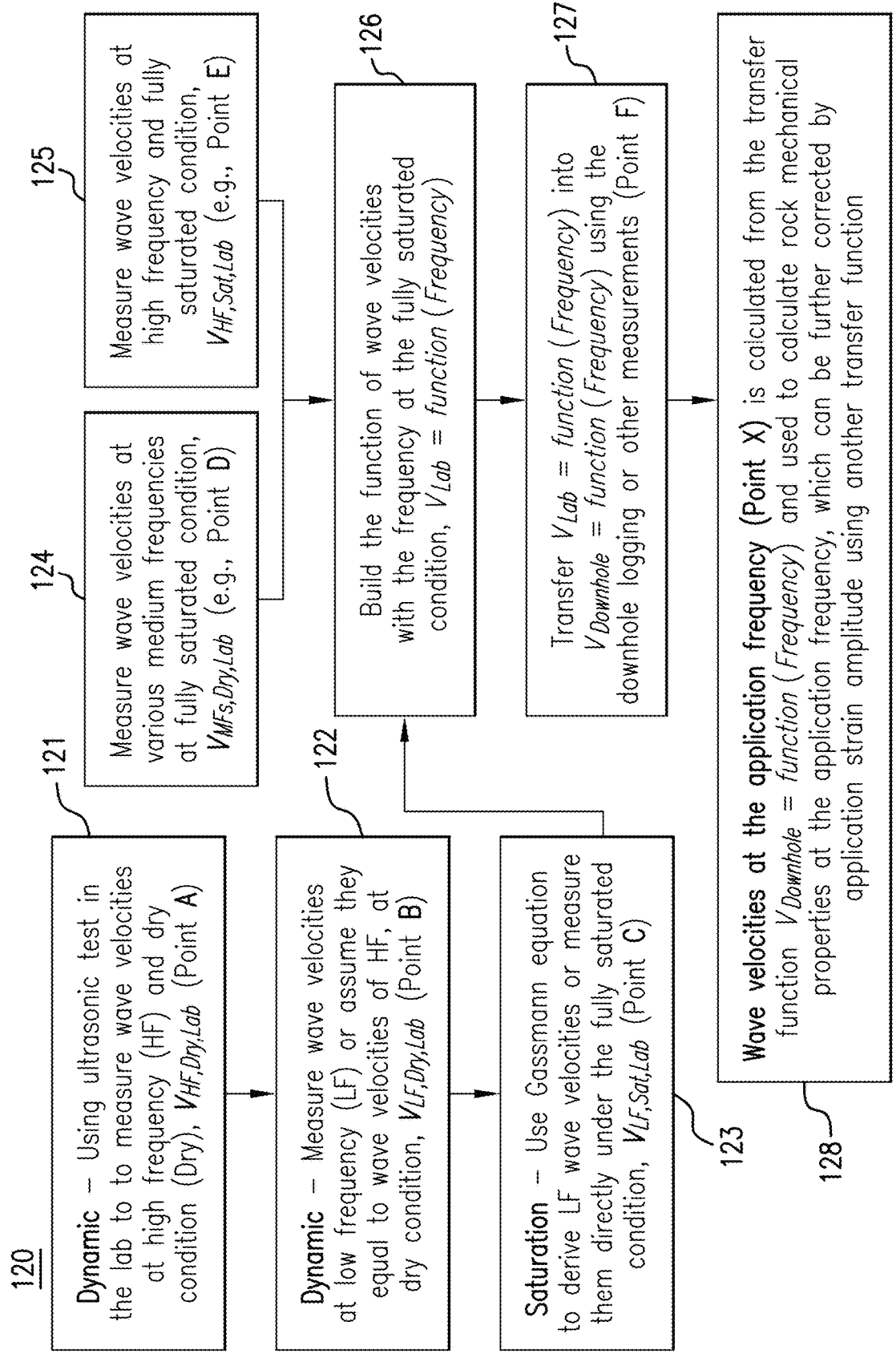
FIG. 9 depicts an embodiment of a method of generating a frequency transfer function.
Figure 10:
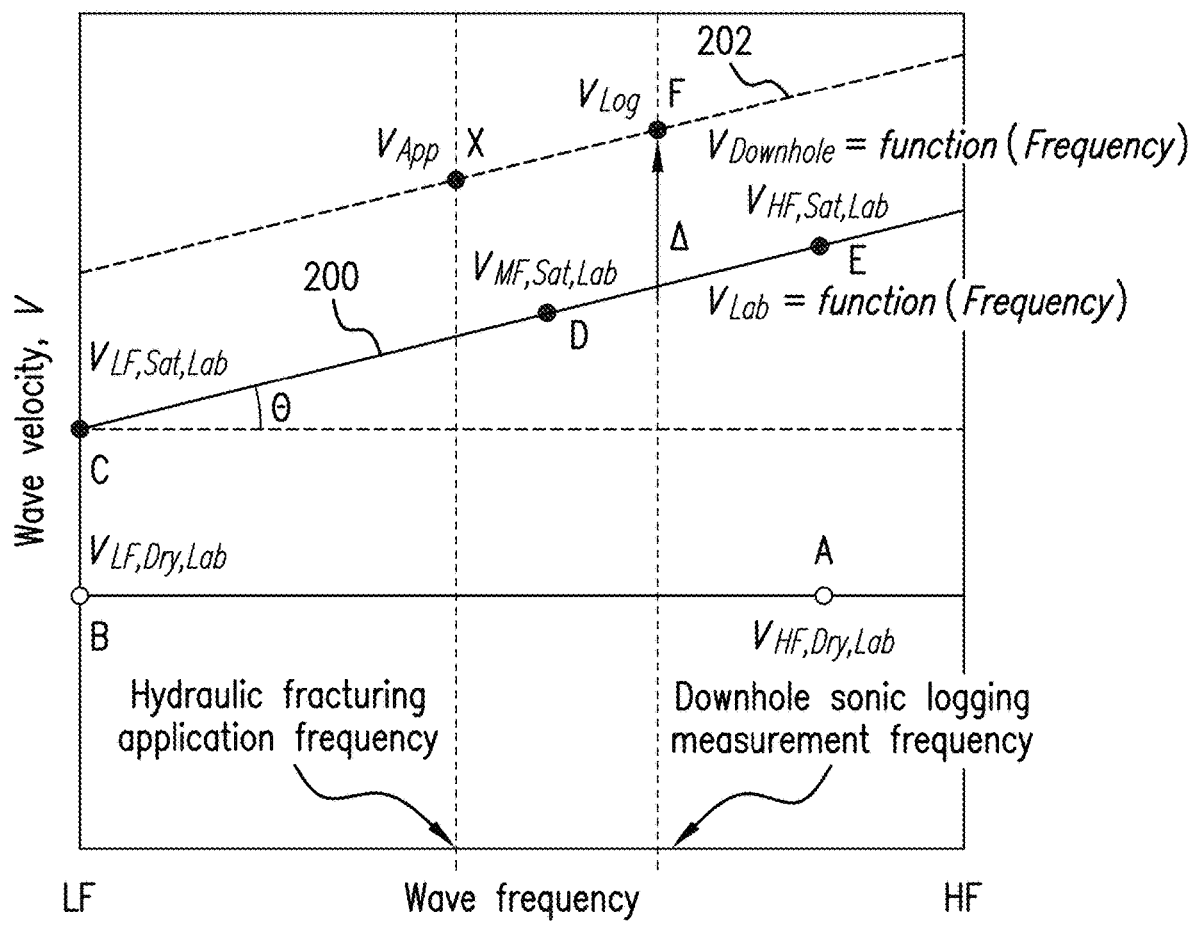
FIG. 10 depicts an example of frequency transfer functions.

FIGS. 9 and 10 depict an example of a method 120 of developing a frequency transfer function for an application or objective. The frequency transfer function is developed to consider the frequency effect and derive the wave velocities at a targeted Fa (e.g. hydraulic fracturing application frequency).

In this example, the frequency transfer function is a downhole frequency transfer function, which is derived by estimating the $V_{Lab}(f)$ and adjusting the $V_{Lab}(f)$ function as described herein. This example may be part of stages 102 and 103 of the method 100. The method 120 includes a plurality of stages or steps represented by blocks 121-128, all of which can be performed sequentially. However, in some embodiments, one or more of the stages can be performed in a different order than that shown or fewer than the stages shown may be performed.

This example is discussed in conjunction with a hydraulic fracturing application, and the frequency transfer function is used to design a hydraulic fracturing job. Also in this example, downhole logging measurements are used to derive the transfer function. The method is not so limited, as various other measurements can be used.

The method 120 is described in conjunction with the wave velocity functions shown in FIG. 10 for illustration purposes. The various measurements described below may be performed in the order described or in another order. In addition, one or more of the measurements may be excluded. In addition, although the functions are shown as linear in FIG. 10, they are not so limited and can be curved or otherwise form any shape or follow any path.

In the following, the test condition is a dry condition, and the subterranean condition is a fully saturated condition. Embodiments are not so limited, as the conditions can be any of a variety of conditions, such as different saturation levels, types of fluid, temperature, pressure and others. In addition, the method 120 may be performed for any number of conditions (e.g., a dry condition and different saturation levels). It is noted that a "dry" condition may include one or more conditions where the material or core sample is not completely devoid of fluid, but has some level of fluid saturation that is less than a fluid saturation level associated with the subterranean condition.

At block 121, wave velocities $V_{HF,Dry,Lab}$ are measured by applying ultrasonic measurement signals to a dry core sample using a high frequency (HF), e.g., a frequency of acoustic or ultrasonic signals used in a laboratory or testing environment. An example of a high frequency is about 1000 kHz.

For example, referring to FIG. 10, ultrasonic tests are performed in a lab to measure wave velocities at high frequency (HF) and dry condition (Dry). The measured wave velocity $V_{HF,Dry,Lab}$ is shown as Point A.

At block 122, wave velocities $V_{LF,Dry,Lab}$ associated with measurement signals having a low frequency are acquired. In one embodiment, a low frequency is a frequency of acoustic signals used in downhole measurements, such as about 20 kHz or several Hz. Wave velocity data can be measured by applying measurement signals to the core sample using the low frequency. Alternatively, the low frequency wave velocities $V_{LF,Dry,Lab}$ at the dry condition can be assumed to be equal to the high frequency wave velocities $V_{HF,Dry,Lab}$.

For example, referring to FIG. 10, wave velocities at low frequency (LF) are measured or assumed to be equal to wave velocities of HF, at dry condition. The resulting velocity $V_{LF,Dry,Lab}$ is shown as Point B.

At block 123, a Gassmann fluid substitution model is used to derive wave velocities $V_{LF,Sat,Lab}$ under a fully saturated condition and low frequency. For example, referring to FIG. 10, a Gassmann equation is used to derive LF wave velocities, or LF wave velocities are directly measured under the fully saturated condition, resulting in velocity $V_{LF,Sat,Lab}$ at Point C.

At block 124, wave velocities $V_{HF,Sat,Lab}$ are measured at various medium frequencies at fully saturated condition. For example, the velocity is shown as Point D in FIG. 10.

At block 125, and wave velocities $V_{HF,Sat,Lab}$ are measured at a high frequency (block 125). For example, the wave velocity is measured under the fully saturated condition, resulting in velocity $V_{HF,Sat,Lab}$ (Point E in FIG. 10).

At block 126, the $V_{Lab}(f)$ function at a fully saturated condition is built from the velocities acquired at blocks 123-125. The $V_{Downhole}(f)$ function is then built using downhole measurements (block 127). The $V_{Lab}(f)$ function and the $V_{Downhole}(f)$ function are shown in FIG. 10 as lines 200 and 202, respectively. For example, the $V_{Lab}(f)$ function is transferred or shifted to the $V_{Downhole}(f)$ function based on logging date ($V_{Log}$), shown as Point F.

It is noted that $V_{Log}$ (Point F) can be replaced by various other measurements, such as seismic measurements ($V_{seismic}$), in-situ measurements ($V_{in\ situ}$), or other measurements, depending on which measurement is used to transfer the $V_{Lab}(f)$ function for a specific application. The $V_{Downhole}(f)$ function can thus be based on various types of measurements.

As shown in FIG. 10, the $V_{Lab}(f)$ function is shifted by an amount shown as $\Delta = V_{Downhole}(f) - V_{Lab}(f)$. A can be negative, zero, or positive, which takes into account the difference in the measurement conditions between lab and downhole, e.g., stress, temperature, and so on.

At block 128, wave velocities at the application frequency Fa can then be calculated from the $V_{Downhole}(f)$ function. For example, the application frequency is calculated in FIG. 10 as Point X. The wave velocity can then be used to calculate rock mechanical properties at the application frequency.

In one embodiment, the calculated rock mechanical properties can be further corrected based on application strain amplitude using another transfer function, referred to herein as a strain amplitude transfer function. The strain amplitude transfer function is used to transfer rock mechanical properties measured at Am to those at application Aa. This transfer function may be built using laboratory tests, which measure rock mechanical properties at both Am and Aa. Note that rock samples having different porosities and mineralogical compositions result in different rock mechanical properties.

Figure 11:
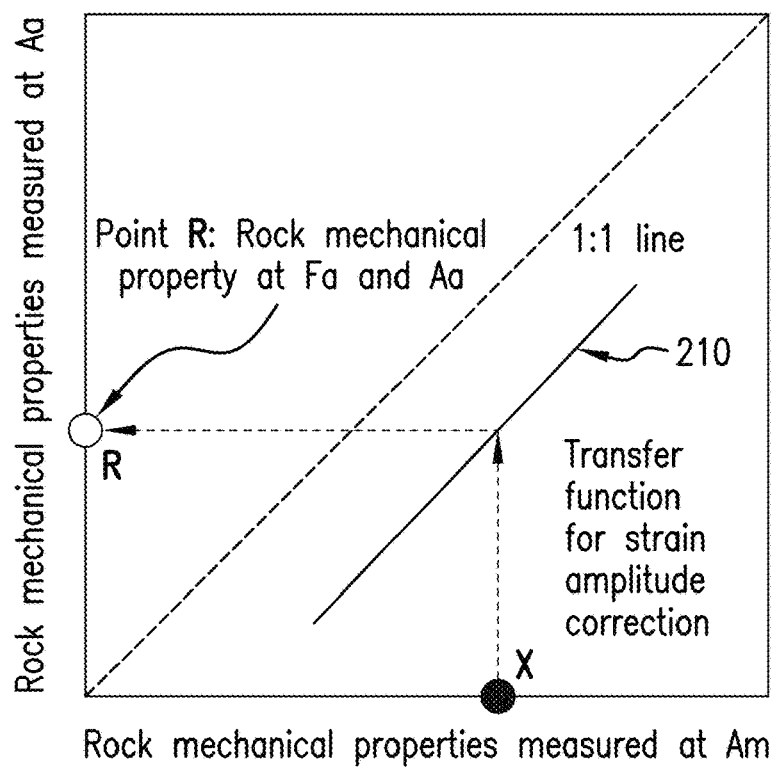
FIG. 11 depicts an example of a strain amplitude transfer function.

FIG. 11 shows an example of a strain amplitude transfer function. In this example, the horizontal and vertical axes are rock mechanical property measurements on rock samples of different porosities and mineralogical composition, at Am and Aa.

Point X is a rock mechanical property value at Fa (e.g., the wave velocity or Young's Modulus, which was derived as discussed above in conjunction with FIGS. 9 and 10. From this value, rock mechanical property at Aa and (Fa), shown as Point R, can be derived from a strain amplitude transfer function 210. Point R can then be used as the rock mechanical property in targeted application of Fa and Aa.

This straight line transfer function is just an example for illustration purpose; It could be any shape of function built from measurement data. The straight line transfer function can be any place below, above or on the 1:1 line. Frequency and strain amplitude transfer functions are not necessary used in sequential order. They can be used in any order or used together.

The following is a description of an example of a method of predicting static mechanical properties, performed based on the methods 100 and 120 discussed above. In this example, a static mechanical property is predicted for a wellbore stability evaluation application, based on downhole logging measurements. Static mechanical properties are used in wellbore stability applications, which have similar frequency and strain amplitude as that in the surface lab static tests.

This example includes building a $V_{Lab}(f)$ frequency transfer function to build a lab frequency transfer function based on lab measurements. Downhole logging measurements represented by Point F in FIG. 10 are used to transfer the $V_{Lab}(f)$ function to the downhole frequency transfer function $V_{Downhole}(f)$.

Referring to FIG. 12, the $V_{Downhole}(f)$ function is used to derive the wave velocity at point C' (low frequency, fully saturated). Gassmann equation is then used to obtain the wave velocities at Point B' (low frequency, dry condition). The wave velocity at Point A' is assumed to be equal to point B'. The dynamic mechanical properties (e.g., dynamic Young's Modulus) are then calculated using the wave velocity at Point A'

Figure 13:
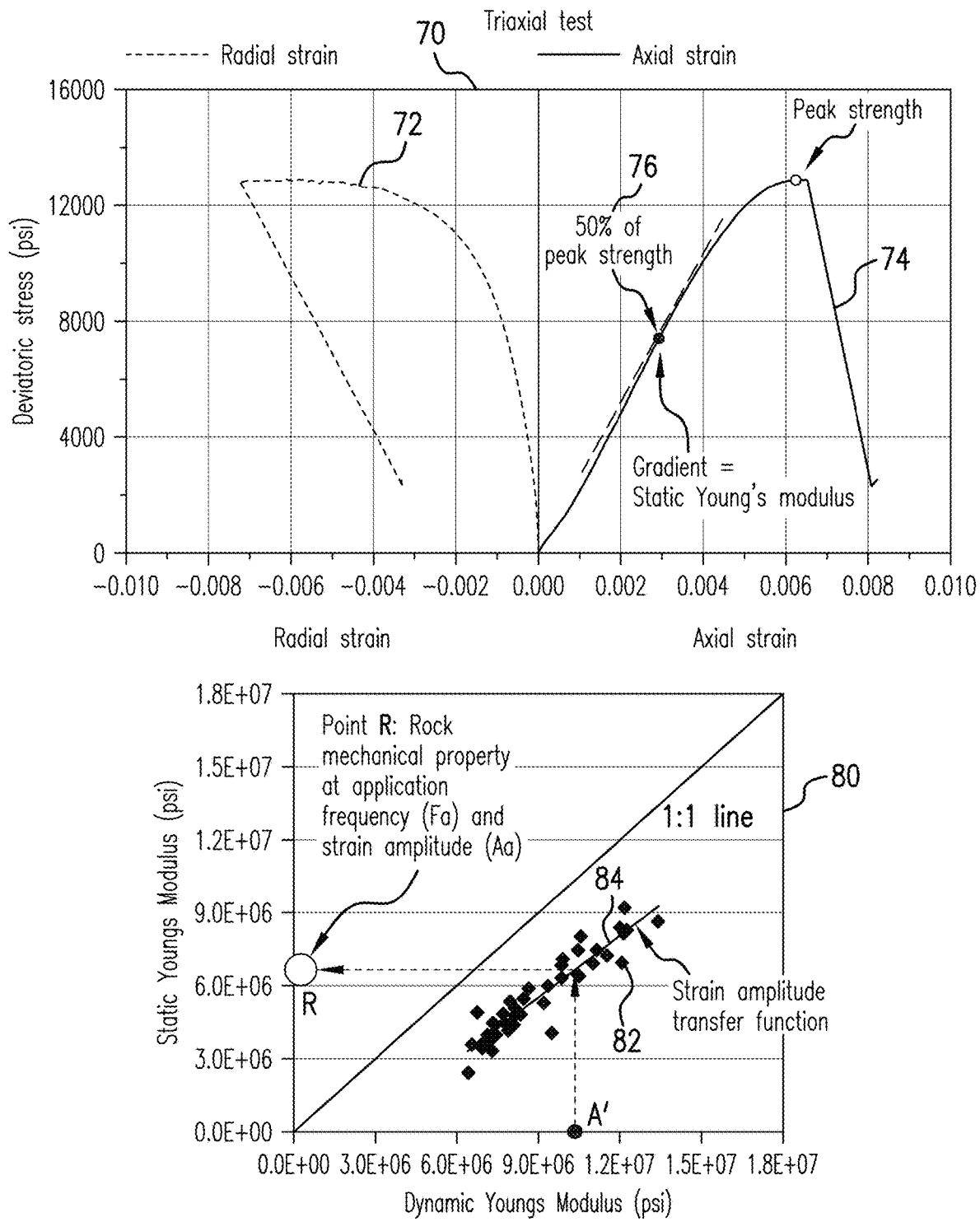

Referring to FIG. 13, a strain amplitude transfer function is utilized to calculate the static mechanical properties at an application frequency Fa and amplitude Aa. The static Young's modulus at strain amplitude Aa is measured from triaxial tests, and the dynamic Young's modulus at measurement strain amplitude Am is measured from ultrasonic wave velocities measurements at a dry condition. The static Young's modulus may be calculated from 50% of peak strength in the triaxial test, or can be calculated at any portion of curve 74, depending on the applications. Peak strength is one stress state where the rock sample breaks apart subjected to externally applied force.

A strain amplitude transfer function between lab dynamic and lab static Young's modulus is built. For example, the strain amplitude transfer function corresponds to the correlation function 84. The static Young's modulus at wellbore stability application frequency (Fa) and strain amplitude (Aa) is derived based on the dynamic Young's Modulus calculated at Point A'. In this example, static Youngs Modulus at Fa and Aa is shown as Point R. This value has already been frequency corrected using the downhole frequency transfer function.

FIG. 14 is a wave-velocity vs frequency graph that illustrates an example of the performance of the method 100 and/or the method 120. In this example, the $V_{Lab}(f)$ function is developed from core measurements at various frequencies and saturation conditions. Downhole wave velocity measurements are taken during downhole measurements using medium frequency MF acoustic signals (represented by data point D), and downhole measurements are used to shift the $V_{Lab}(f)$ function to the $V_{Downhole}(f)$ function, represented by line 130. The wave velocity at the saturated condition at low frequency $V_{LF,Reservoir}$ (point C) is determined from the $V_{Downhole}(f)$ function, and the wave velocity $V_{LF,Dry,Reservoir}$ under the dry condition (point B) is derived using a Gassmann fluid substitution model. The velocity $V_{HF,Dry,Reservoir}$ at the high frequency HF is determined (point A). Lastly, the dynamic Young's modulus $E_d$ is computed from the wave velocity at the high frequency and dry condition, and the static Young's modulus $E_s$ is derived from the lab-derived correlation function of static-dynamic moduli (e.g., at FIG. 5).

FIG. 15 shows a comparison between wave velocities measured using laboratory experiments on material samples, and wave velocities calculated based on methods described herein. Three sandstone outcrops were selected to perform laboratory experiments at dry and fluid saturated conditions.

Table 1 shows the measured bulk density (dry), porosity, and permeability of three sandstone samples:

| Outcrop | Abbreviation | Bulk Density Dry (g/cc) | Porosity (%) | Permeability (mD) |
|---|---|---|---|---|
| Berea Spider | BS1 | 2.216 | 17.68 | 77.150 |
| Carbon Tan | CT1 | 2.319 | 13.90 | 15.350 |
| Fountainebleau | FB4 | 2.546 | 5.00 | 0.007 |

Table 2 shows the measured mineralogical concentration (weight %) from x-ray diffraction analysis.

| | Weight % | | |
|---|---|---|---|
| Mineral | CT1 | BS1 | FB4 |
| Quartz | 54.4 | 54 | 100 |
| K-Feldspar | 0.2 | 12.5 | 0 |
| Na-Feldspar | 0.5 | 5.2 | 0 |
| Calcite | 24 | 0 | 0 |
| Dolomite | 12.2 | 0 | 0 |
| Ankerite | 0 | 0.1 | 0 |
| Siderite | 0 | 1.3 | 0 |
| Hematite | 0.2 | 0 | 0 |
| Fe | 0 | 0.2 | 0 |
| Kaolinte | 2.5 | 13.6 | 0 |
| Illite/Mica | 5.5 | 12.3 | 0 |
| Chlorite | 0.5 | 0.8 | 0 |
| Total | 100 | 100 | 100 |

FIG. 15 shows a comparison between the wave velocity $V_{HF,Dry,Reservoir}$ for the three samples as predicted using the methods described herein ("Vp Calc") and the wave velocity as directly measured in the laboratory ("Vp Lab Dry Meas.") The Vp Calc axis represents As is shown, the predicted and measured velocity match very well, thus demonstrating the applicability of the embodiments described herein.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a material mechanical property of a porous material for an application or objective with a specific application frequency and application strain amplitude, the method comprising:
    estimating an application frequency and an application strain amplitude for use in a targeted application or objective;
    constructing a frequency transfer function based on measurement data acquired using measurement signals having a measurement frequency range and a measurement strain amplitude, the frequency transfer function relating the material mechanical property to measurement frequencies, the material mechanical property including a frequency-dependent mechanical property of a solid material, the measurement frequency range including a measurement frequency different from the application frequency;
    constructing a strain amplitude transfer function based on the measurement data, the strain amplitude transfer function relating the material mechanical property at the measurement strain amplitude and the material mechanical property at the application strain amplitude, the measurement strain amplitude different from the application strain amplitude;
    deriving the material mechanical property from the frequency transfer function using the application frequency; and
    predicting the material mechanical property from the strain amplitude transformation function using the derived material mechanical property.

2. The method of claim 1, wherein the material mechanical property is an application specific mechanical property.

3. The method of claim 2, wherein constructing the frequency transfer function includes building a correlation function relating the mechanical property at an application frequency to a dynamic mechanical property, the dynamic mechanical property being a mechanical property that changes depending on a value of the measurement frequency and the measurement strain amplitude.

4. The method of claim 3, wherein constructing the frequency transfer function includes generating a first wave velocity function based on the measurement data, the first wave velocity function based on test measurements performed under a plurality of conditions of the material, the plurality of conditions including a subterranean condition and a surface test condition.

5. The method of claim 4, wherein the subterranean condition is a condition in which the material is at a first saturation level, and the test condition is a condition in which the material is at a second saturation level that is less than or the same as the first saturation level.

6. The method of claim 4, wherein the first wave velocity function is based on test measurements performed at a plurality of measurement frequencies.

7. The method of claim 4, wherein the frequency transfer function is constructed by shifting the first wave velocity function to the frequency transfer function based on subterranean measurement data.

8. The method of claim 7, wherein deriving the material mechanical property from the frequency transfer function includes calculating a wave velocity at the application frequency based on the frequency transfer function.

9. The method of claim 2, wherein the strain amplitude transfer function is based on the correlation function.

10. The method of claim 1, wherein the strain amplitude transfer function relates one or more mechanical properties measured at the measurement strain amplitude, and one or more mechanical properties measured at the application strain amplitude.

11. A system for estimating a material mechanical property of a subterranean material for an application or objective with a specific application frequency and application strain amplitude, the system comprising:
    a processing device configured to determine an estimated application frequency and an estimated application strain amplitude for use in a targeted application or objective, the processing device configured to receive measurement data acquired using measurement signals having a measurement frequency range and a measurement strain amplitude, and perform:
    constructing a frequency transfer function based on the measurement data, the frequency transfer function relating the material mechanical property to measurement frequencies, the material mechanical property including a frequency-dependent mechanical property of a solid material, the measurement frequency range including a measurement frequency different from the application frequency;
    constructing a strain amplitude transfer function based on the measurement data, the strain amplitude transfer function relating the material mechanical property at the measurement strain amplitude and the material mechanical property at the application strain amplitude, the measurement strain amplitude different from the application strain amplitude;
    deriving the material mechanical property from the frequency transfer function using the application frequency; and
    predicting the material mechanical property from the strain amplitude transformation function using the derived material mechanical property.

12. The system of claim 11, wherein the material mechanical property is an application specific static mechanical property.

13. The system of claim 12, wherein constructing the frequency transfer function includes building a correlation function relating the mechanical property at an application frequency to a dynamic mechanical property, the dynamic mechanical property being a mechanical property that changes depending on a value of the measurement frequency and the measurement strain amplitude.

14. The system of claim 13, wherein constructing the frequency transfer function includes generating a first wave velocity function based on the measurement data, the first wave velocity function based on test measurements performed under a plurality of conditions of the material, the plurality of conditions including a subterranean condition and a surface test condition.

15. The system of claim 14, wherein the subterranean condition is a condition in which the material is at a first saturation level, and the test condition is a condition in which the material is at a second saturation level that is less than or the same as the first saturation level.

16. The system of claim 14, wherein the first wave velocity function is based on test measurements performed at a plurality of measurement frequencies.

17. The system of claim 14, wherein the frequency transfer function is constructed by shifting the first wave velocity function to the frequency transfer function based on subterranean measurement data.

18. The system of claim 17, wherein deriving the material mechanical property from the frequency transfer function includes calculating a wave velocity at the application frequency based on the frequency transfer function.

19. The system of claim 12, wherein the strain amplitude transfer function is based on the correlation function.

20. The system of claim 11, wherein the strain amplitude transfer function relates one or more mechanical properties measured at the measurement strain amplitude, and one or more mechanical properties measured at the application strain amplitude.

* * * * *